United States Patent
Matsen et al.

(10) Patent No.: US 8,383,998 B1
(45) Date of Patent: Feb. 26, 2013

(54) TOOLING INSERTS FOR LAMINATED TOOLING

(75) Inventors: Marc R. Matsen, Seattle, WA (US);
Kim E. Peterson, Bellevue, WA (US);
John B. Moser, Bonney Lake, WA (US);
Steven W. Morgan, Kirkland, WA (US);
William C. Dykstra, Rockford, MI (US); Lee C. Firth, Renton, WA (US)

(73) Assignee: The Boeing Company, Chicago, IL (US)

( * ) Notice: Subject to any disclaimer, the term of this patent is extended or adjusted under 35 U.S.C. 154(b) by 484 days.

(21) Appl. No.: 12/610,916

(22) Filed: Nov. 2, 2009

(51) Int. Cl.
*H05B 6/00* (2006.01)
(52) U.S. Cl. ............ 219/618; 219/633; 219/634
(58) Field of Classification Search .......... 219/618, 219/633, 634, 603, 604, 615, 622, 645, 647
See application file for complete search history.

(56) References Cited

U.S. PATENT DOCUMENTS

| | | | |
|---|---|---|---|
| 5,530,227 A * | 6/1996 | Matsen et al. ........... | 219/633 |
| 5,591,369 A | 1/1997 | Matsen et al. | |
| 5,591,370 A | 1/1997 | Matsen et al. | |
| 5,599,472 A | 2/1997 | Brown et al. | |
| 5,645,744 A * | 7/1997 | Matsen et al. ........... | 219/634 |
| 5,683,608 A | 11/1997 | Matsen et al. | |
| 5,728,309 A | 3/1998 | Matsen et al. | |
| 5,770,136 A | 6/1998 | Huang | |
| 5,916,469 A | 6/1999 | Scoles et al. | |
| 6,211,497 B1 | 4/2001 | Matsen et al. | |
| 6,566,635 B1 | 5/2003 | Matsen et al. | |
| 2009/0071217 A1 | 3/2009 | Matsen et al. | |
| 2009/0074905 A1 * | 3/2009 | Matsen et al. ........... | 425/547 |

OTHER PUBLICATIONS

USPTO Notice of Allowance dated Jun. 29, 2012 regarding U.S. Appl. No. 12/644,787, 6 pages.
Matsen, et al., "Flexible Coil Segments for High Efficiency Inductors," as filed U.S. Appl. No. 12/644,787, Dec. 22, 2009, 43 pages.

* cited by examiner

*Primary Examiner* — David Nhu
(74) *Attorney, Agent, or Firm* — Yee & Associates, P.C.

(57) ABSTRACT

An apparatus may comprise a first tool die and a second tool die, each having a tool base. Each tool base may have a laminated structure that has a plurality of spaced metallic laminations. The laminated structure may have a truncated portion forming a cavity configured to receive a tool insert, and at least one opening for receiving an induction coil. The first tool die and the second tool die may also have a tool insert configured to be received in the cavity of the tool base. The tool insert may have a die susceptor capable of being heated by the induction coil. The apparatus may also have an actuator for moving the first tool die and the second tool die toward one another for forming a component between the die susceptor of the tool insert of the first tool die and the die susceptor of the tool insert of the second tool die.

21 Claims, 15 Drawing Sheets

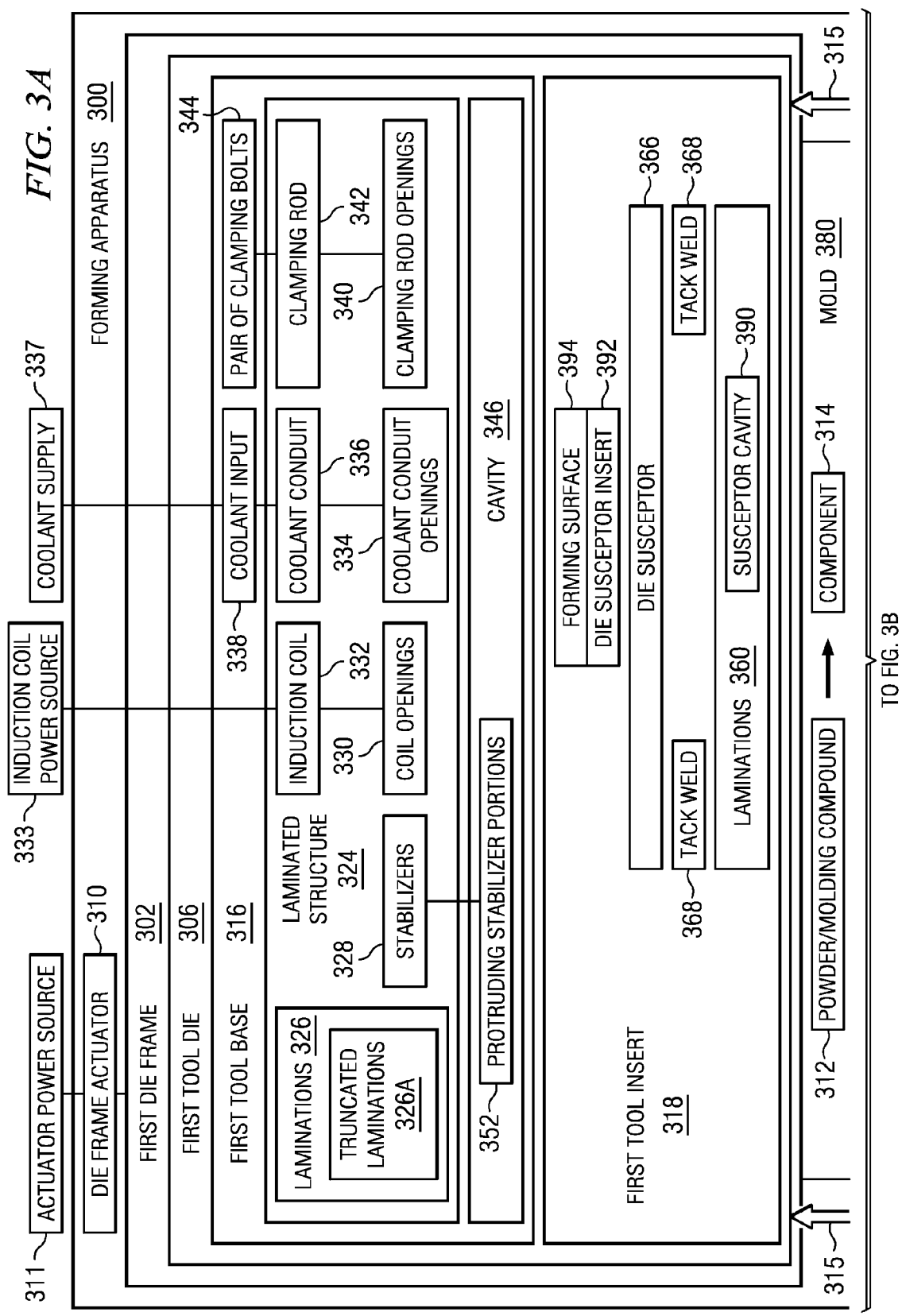

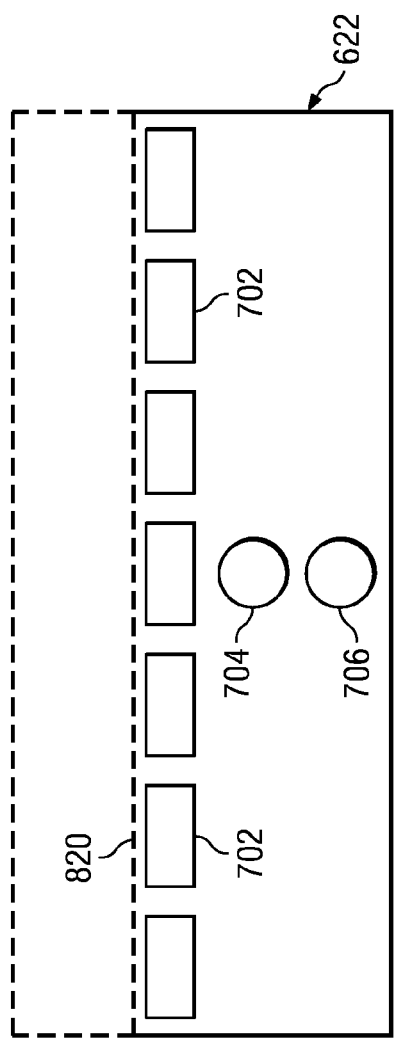
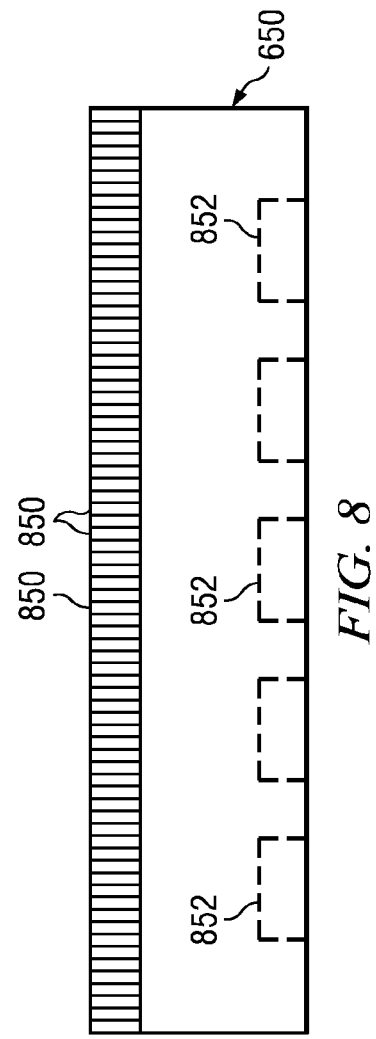

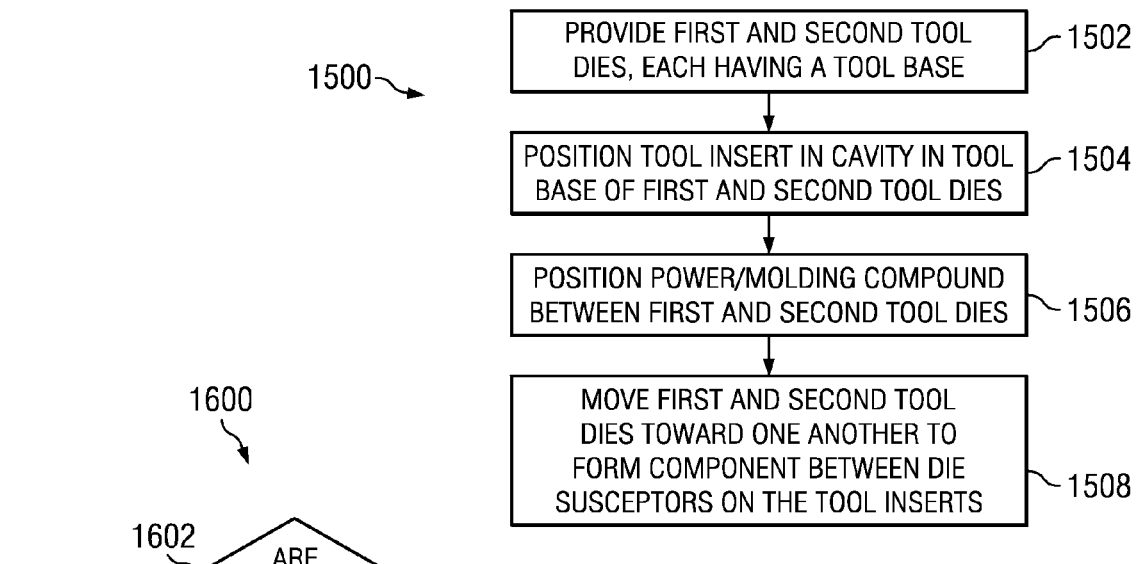
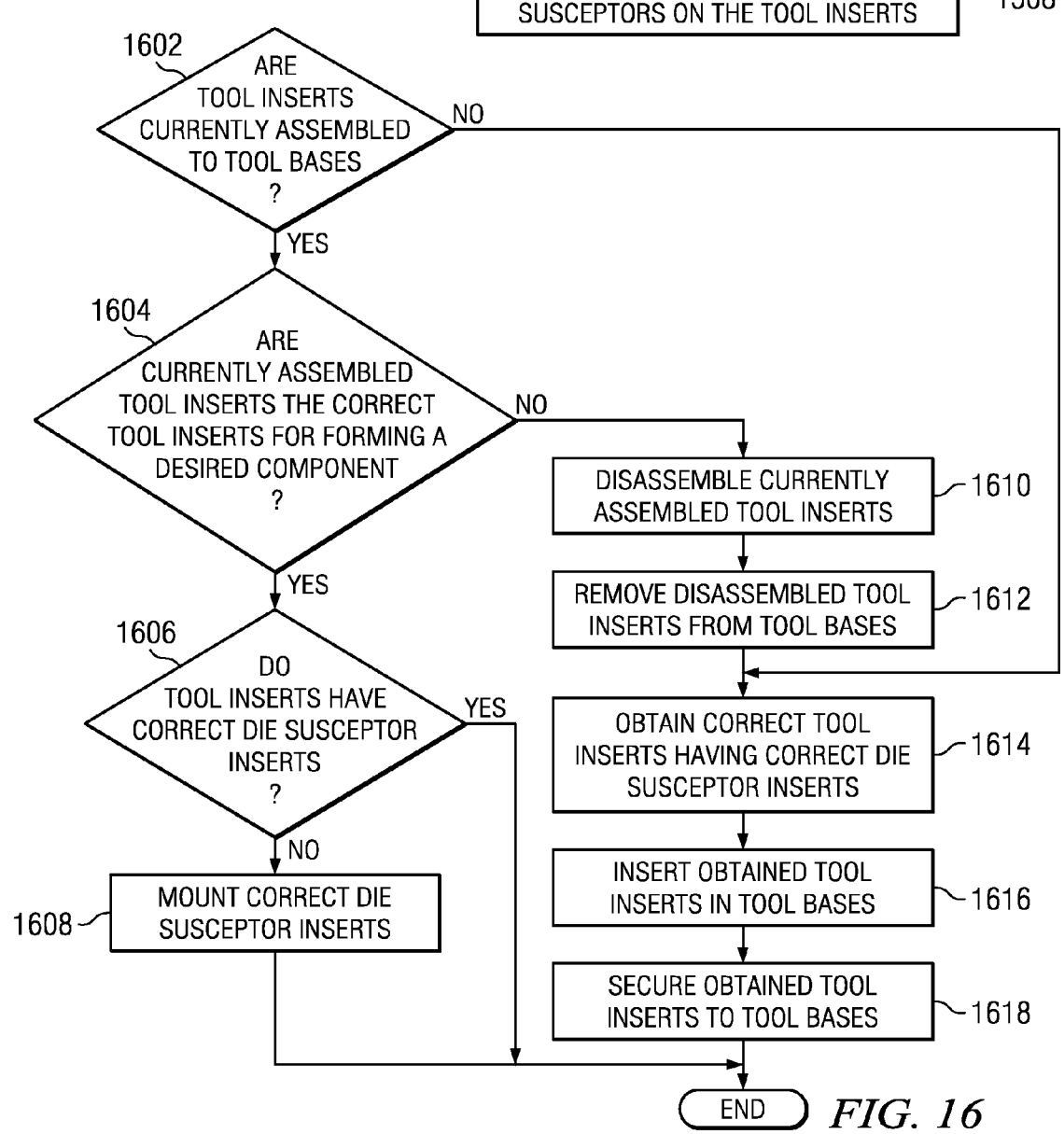

TOOLING INSERTS FOR LAMINATED TOOLING

BACKGROUND INFORMATION

1. Field

The present disclosure relates generally to a forming apparatus and method. More particularly, the present disclosure relates to an induction forming apparatus and method for molding and consolidating components for aircraft and other applications.

2. Background

Induction molding of thermoplastic components, such as thermoplastic composite components, and consolidation of low cost powders, such as titanium powders, may hold significant processing advantages. U.S. Patent Publication No. 2009/0071217, the disclosure of which is hereby incorporated by reference, describes an induction molding apparatus and method that may enable both an increase in production rates and a reduction in production costs.

The induction molding apparatus described in U.S. Patent Publication No. 2009/0071217 has a set of first and second tool dies that are moveable toward and away from each other to mold a component therebetween. Each tool die includes a die susceptor that is appropriately contoured to form a molded component having a desired configuration.

To use the molding tool described in U.S. Patent Publication No. 2009/0071217 to mold components having different configurations, it may be necessary to construct a plurality of sets of tool dies, the tool dies of each set having differently contoured die susceptors. Constructing and maintaining a plurality of different tool die sets for molding differently configured components may increase overall fabrication costs and tool inventory requirements.

Therefore, it would be advantageous to have a forming apparatus and method that takes into account one or more of the issues discussed above, as well as possibly other issues.

SUMMARY

In one advantageous embodiment, an apparatus may comprise a first tool die and a second tool die, the first tool die and the second tool die each having a tool base. Each tool base may have a laminated structure that has a plurality of spaced metallic laminations. The laminated structure may have a truncated portion forming a cavity configured to receive a tool insert, and at least one opening for receiving an induction coil. The first tool die and the second tool die may also have a tool insert configured to be received in the cavity of the tool base. The tool insert may have a die susceptor capable of being heated by the induction coil. The apparatus may also have an actuator for moving the first tool die and the second tool die toward one another for forming a component between the die susceptor of the tool insert of the first tool die and the die susceptor of the tool insert of the second tool die.

In another advantageous embodiment, a method may be present for forming a component. A first tool die and a second tool die may be provided. The first tool die and the second tool die may each have a tool base that has a laminated structure having a plurality of spaced metallic laminations, the laminated structure of each tool base having a truncated portion forming a cavity configured to receive a tool insert, and at least one opening for receiving an induction coil. A tool insert may be positioned in the cavity of the tool base of each of the first and second tool dies. The tool insert may have a die susceptor capable of being heated by the induction coil. The first tool die and the second tool die may be moved toward one another for forming a component between the die susceptor of the tool insert of the first tool die and the die susceptor of the tool insert of the second tool die.

In another advantageous embodiment, a method may be present for forming a component. A first tool die and a second tool die may be provided. The first tool die and the second tool die may each have a tool base comprising a laminated structure having a plurality of spaced metallic laminations, the laminated structure of each tool base having a truncated portion forming a cavity configured to receive a tool insert, and at least one opening for receiving an induction coil. Tool inserts for the tool bases of each of the first and second tool dies may be selected, and die susceptor inserts for the tool inserts may be selected. The selected die susceptor inserts may have die susceptors for forming a component. The selected die susceptor inserts may be positioned in the selected tool inserts, and the selected tool inserts may be positioned in the cavities of the tool bases of each of the first and second tool dies. The first tool die and the second tool die may be moved toward one another for forming the component between the die susceptors of the selected die susceptor inserts.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, and further objectives and advantages thereof, will best be understood by reference to the following detailed description of advantageous embodiments of the present disclosure when read in conjunction with the accompanying drawings, wherein:

FIGS. 3A and 3B are an illustration of an induction forming apparatus in accordance with an advantageous embodiment;

FIG. 7 is an illustration of a cross-sectional view of a tool base of a tool die of the induction forming apparatus of FIG. 6 taken along line 7-7 in FIG. 6;

FIG. 8 is an illustration of a cross-sectional view of a tool insert of a tool die of FIG. 6 taken along line 8-8 in FIG. 6;

FIG. 15 is an illustration of a flowchart of a process for forming a component in accordance with an advantageous embodiment;

FIG. 16 is an illustration of a flowchart of a process for assembling an induction forming apparatus in accordance with an advantageous embodiment.

DETAILED DESCRIPTION

Figure 1:
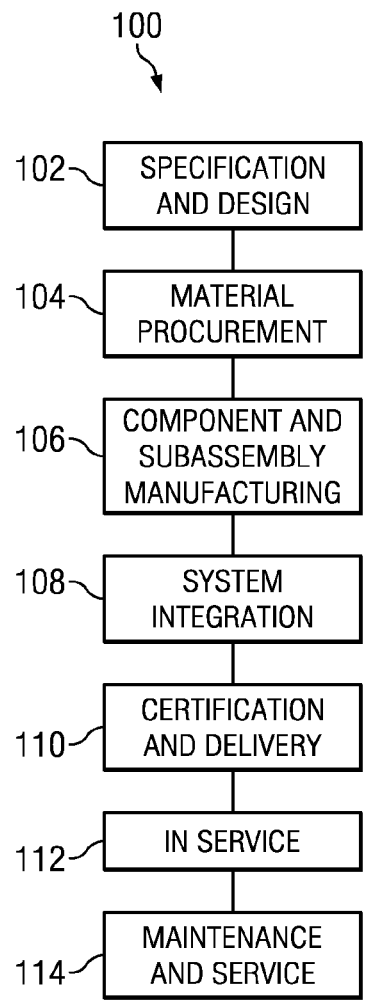
FIG. 1 is an illustration of an aircraft manufacturing and service method in accordance with an advantageous embodiment.
Figure 2:
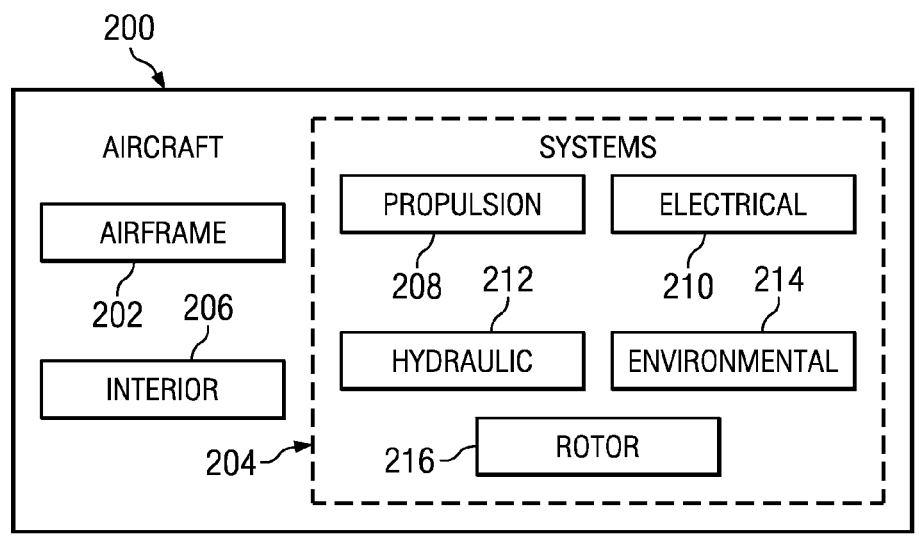
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

Figure 3B:
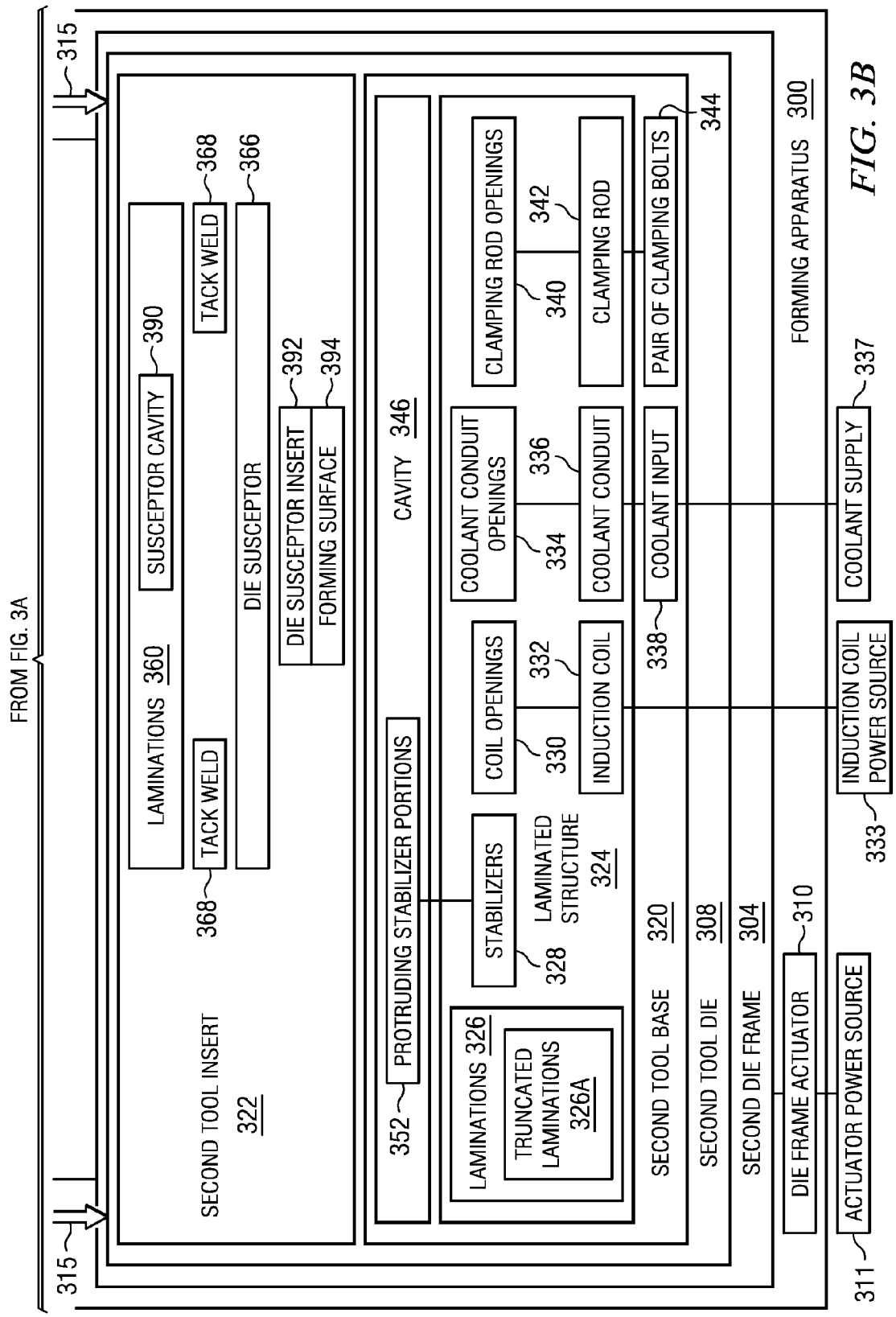

With reference now to FIGS. 3A and 3B, an illustration of a forming apparatus is depicted in accordance with an advantageous embodiment. In this advantageous embodiment, the forming apparatus is designated by reference number 300, and may be used to mold thermoplastic components, for example and without limitation, thermoplastic composite components, and to consolidate powders, for example and without limitation, titanium powders.

Forming apparatus 300 may have a first die frame 302 and a second die frame 304. A first tool die 306 may be mounted on and supported by the first die frame 302, and a second tool die 308 may be mounted on and supported by the second die frame 304. A die frame actuator 310, which may be operated hydraulically or in another manner from an external actuator power source 311, may be provided to move the first tool die 306 and the second tool die 308 toward and away from each other, as indicated by arrows 315, during operation of forming apparatus 300 to consolidate/mold a powder/molding compound 312 positioned therebetween to form a component 314.

First tool die 306 may have a first tool base 316 and a first tool insert 318. Second tool die 308 may have a second tool base 320 and a second tool insert 322. First tool base 316 may be substantially identical to second tool base 320. Each tool base may have a laminated structure 324. Laminated structure 324 may include a plurality of spaced metallic laminations 326 which are separated from one another by a plurality of dielectric stabilizers 328. A plurality of rows of coil openings 330 are provided in the plurality of metallic laminations 326 and in the plurality of stabilizers 328 to receive an induction coil 332 for heating the first and second tool dies 306 and 308. The induction coil 332 may be powered by an external induction coil power source 333. A row of aligned coolant conduit openings 334 may also be provided in the plurality of laminations 326 and in the plurality of dielectric stabilizers 328 to receive a coolant conduit 336. The coolant conduit 336 may be connected to an external coolant supply 337 via a coolant input 338 in the first and second tool bases 316 and 320. A row of aligned clamping rod receiving openings 340 may also be provided in the plurality of metallic laminations 326 and in the plurality of dielectric stabilizers 328 to receive a clamping rod 342 to secure the plurality of metallic laminations 326 and the plurality of dielectric stabilizers 328 together and, in addition, to releasably secure first and second tool inserts 318 and 322 in an insert-receiving cavity 346 in the first and second tool bases 316 and 320, respectively. A pair of clamping bolts 344 may be mounted on opposite ends of clamping rod 342 to releasably secure the first and second tool inserts 318 and 322 in the insert-receiving cavity 346 of the first and second tool bases 316 and 320, respectively.

The plurality of spaced metallic laminations 326 may include a plurality of truncated metallic laminations 326A. Truncated laminations 326A may be centrally positioned in the laminated structure 324 to define cavity 346. The plurality of dielectric stabilizers 328 aligned with the cavity 346 may also include a plurality of protruding stabilizer portions 352 which are configured to extend into cavity 346 to assist in positioning the tool inserts 318 and 322 in the cavities 346 in their respective tool bases 316 and 320.

First tool insert 318 and second tool insert 322 may each include a plurality of spaced metallic laminations 360. The spaced metallic laminations 360 of each tool insert 318 and 322 may be attached to a die susceptor 366 by, for example, tack welds 368. The plurality of spaced metallic laminations 360 of each tool insert 318 and 322, and the die receptor 366 attached thereto, are configured to form a component having a desired configuration.

First tool insert 318 and second tool insert 322 may each define a susceptor insert receiving cavity 390 therein. Susceptor insert receiving cavity 390 may be configured to removably receive a die susceptor insert 392 therein. Die susceptor insert 392 may have a forming surface 394 thereon to form a component having a desired configuration.

Forming apparatus 300 may be used to consolidate/mold a powder/molding compound 312 to form a component 314. For example and without limitation, forming apparatus 300 may be used to mold a thermoplastic material, such as a thermoplastic composite molding compound, to form a thermoplastic composite component; or to consolidate a powder, such as an inexpensive titanium powder, to form a titanium component. Such formed components may be used, for example and without limitation, in aircraft component and subassembly manufacture 106 and in aircraft maintenance and service 114 as illustrated in FIG. 1, and in other applications.

Forming of a component 314 may be accomplished by installing first and second tool inserts 318 and 322, each having a die susceptor 366 contoured to form a component 314 having a desired configuration, or each having a die susceptor insert 392 having a forming surface 394 contoured to form a component 314 having a desired configuration, in cavities 346 in first and second tool bases 316 and 320, respectively. A powder/molding compound 312 suitable for forming the component 314 may then be placed between the first tool die 306 and the second tool die 308, and die frame actuator 310 may be operated to move the first tool die 306 and the second tool die 308 together to consolidate/mold the component 314. If it is desired to consolidate/mold a different component having a different shape, the tool inserts 318 and 322 may be removed from the tool bases 316 and 320, respectively, and replaced with another set of tool inserts 318 and 322 having die susceptors 366 of the appropriate contours. The same tool bases 316 and 320, however, may be used for consolidating/molding both components 314 resulting in a reduction in overall cost and inventory requirements.

If it is desired to consolidate/mold a different but related component, for example and without limitation, a component 314 having the same general size, the die susceptor inserts 392 may be replaced with new die susceptor inserts 392 to form the other component 314 without changing the tool inserts 318 and 322 or the tool bases 316 and 320.

The illustration of forming apparatus 300 in FIGS. 3A and 3B is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
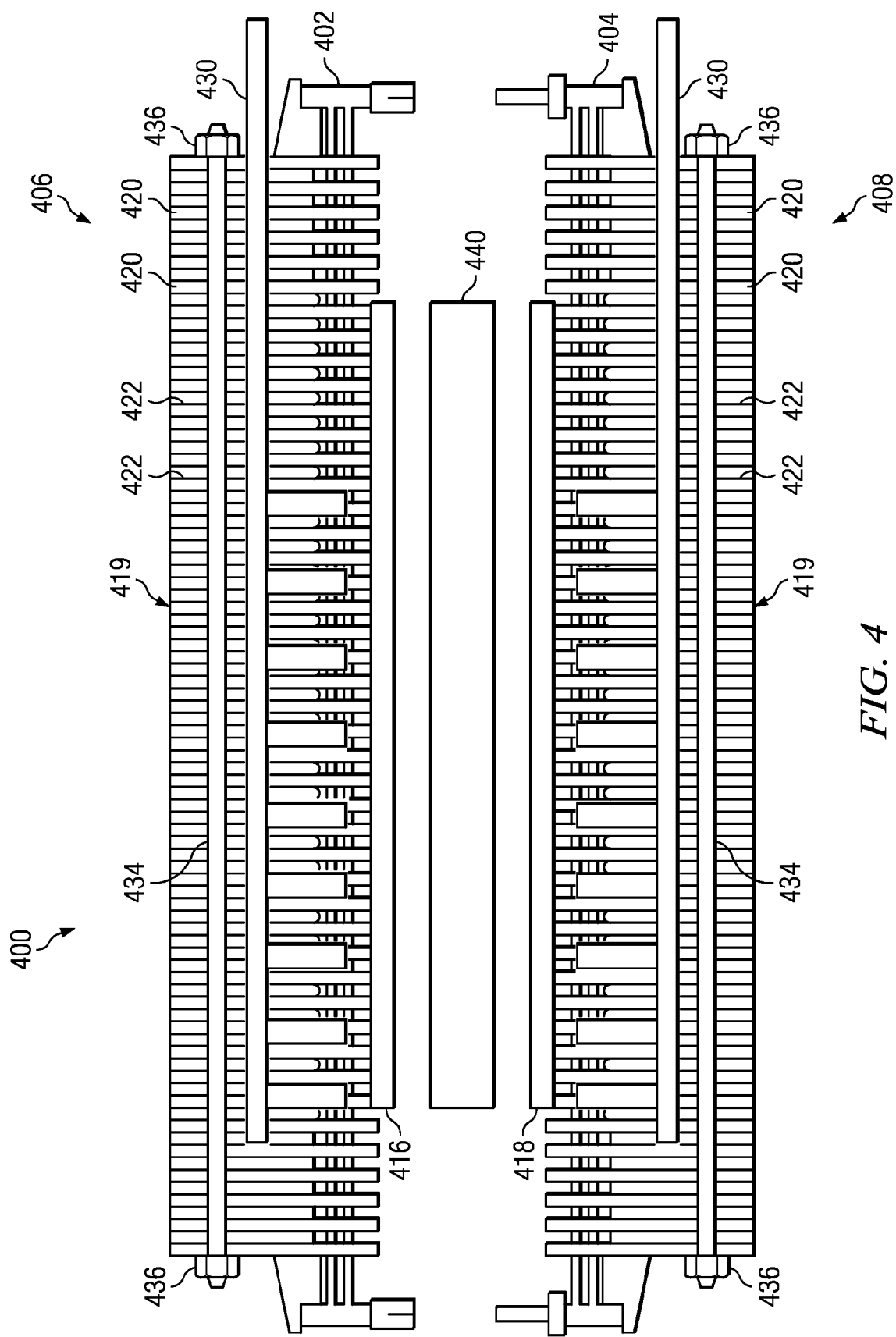
FIG. 4 is an illustration of a front plan view of a known induction forming apparatus to assist in explaining advantageous embodiments.
Figure 5:
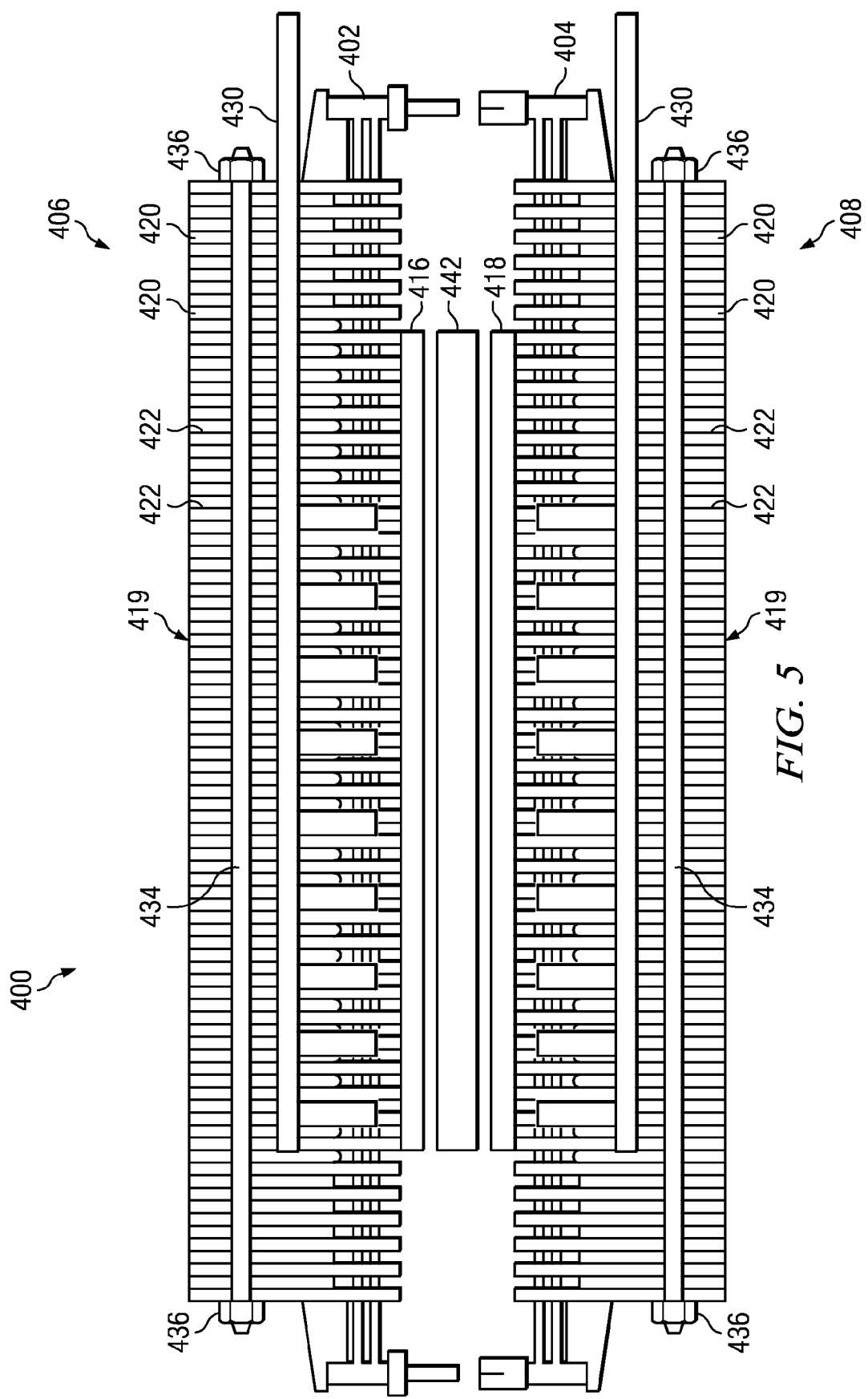
FIG. 5 is an illustration of a front plan view of the known induction forming apparatus of FIG. 4 with the tool dies thereof applying pressure to form a component therebetween to assist in explaining advantageous embodiments.

With reference now to FIGS. 4 and 5, illustrations of a front plan view of a known induction forming apparatus are depicted to assist in explaining advantageous embodiments.

The induction forming apparatus is generally designated by reference number 400, and may include a first die frame 402 supporting a first tool die 406, and a second die frame 404 supporting a second tool die 408. FIG. 4 is an illustration depicting the first and second tool dies separated from one another, and FIG. 5 is an illustration depicting the first and second tool dies moved toward one another to apply pressure for forming a component 442 therebetween. The first tool die 406 and the second tool die 408 may be actuated by a die frame actuator (not shown in FIGS. 4 and 5) to facilitate movement of the first tool die 406 and the second tool die 408 toward and away from each other.

First tool die 406 has a first die susceptor 416 thereon, and second tool die 408 has a second die susceptor 418 thereon. The first and second die susceptors 416 and 418 each have a contour selected to form a component 442 therebetween having a desired configuration.

First and second tool dies 406 and 408 may each include a laminated structure 419 that may have a plurality of spaced metallic laminations or plates 420 separated from one another by a plurality of dielectric stabilizers 422. Although not shown in FIGS. 4 and 5, an induction coil may extend through aligned openings in each of the metallic laminations 420 and each of the dielectric stabilizers 422 in each of the first tool die 406 and the second tool die 408 to selectively heat the first tool die 406 and the second tool die 408. First die susceptor 416 and second die susceptor 418 may be thermally coupled to the induction coils in the first and second tool dies 406 and 408, respectively.

First tool die 406 and second tool die 408 may also have a coolant conduit 430 extending through aligned openings in the metallic laminations 420 and the dielectric stabilizers 422 which is connected to an external coolant supply (not shown) to supply coolant to the tool dies 406 and 408 to cool the die susceptors 416 and 418 and a component 442 formed by forming apparatus 400. Yet further, a clamping rod 434 may be extended through further aligned openings in the metallic laminations 420 and the dielectric stabilizers 422 to secure the laminated structure 419 together. Bolts 436 may be attached at either end of the clamping rod 434 to permit the tool dies 406 and 408 to be tightened to secure the metallic laminations 420 and the dielectric stabilizers 422 in position.

In a typical implementation of a process for forming a component, a powder/molding compound 440 is initially placed between the first tool die 406 and the second tool die 408 as shown in FIG. 4. The first tool die 406 and the second tool die 408 are then moved toward each other as the induction coil heats the first die susceptor 416 and the second die susceptor 418. As the first tool die 406 and the second tool die 408 close toward each other, as shown in FIG. 5, the first die susceptor 416 and the second die susceptor 418 rapidly heat the powder/molding compound 440 to consolidate/mold the powder/molding compound 440 to form component 442 as also shown in FIG. 5. Component 442 may have a configuration that corresponds to the contours of die susceptors 416 and 418.

After cooling the formed component 442 for a predetermined period of time by spraying or otherwise dispensing coolant through coolant conduits 430, the first and second tool dies 406 and 408 are moved apart to the position shown in FIG. 4, and the formed component 442 may be removed. The forming process may be repeated as often as necessary to form as many identical components 442 as may be needed for a particular project.

In forming apparatus 400, the configuration of the components being formed depends on the contours of the die susceptors 416 and 418 on first and second tool dies 406 and 408, respectively. Accordingly, different tool dies 406 and 408 are needed to form components 442 having different configurations. This necessitates maintaining an inventory of tool dies 406 and 408, each of which has its own lamination structure 419, die susceptors 416 or 418, induction coils (not shown in FIGS. 4 and 5), coolant conduits 430 and clamping rods 434 and bolts 436. This may result in significant overall tooling costs and inventory requirements.

According to an advantageous embodiment, a forming apparatus is provided that has tool inserts that may be easily assembled to and disassembled from a reusable tool base to permit differently configured components to be formed simply by changing the tool inserts on the tool bases. According to an advantageous embodiment, the reusable tool base incorporates the bulk of the structure of the forming apparatus and may be used to form differently configured components by changing only the tool insert, resulting in lower tooling costs.

According to a further advantageous embodiment, the tool inserts may, themselves, have die susceptor inserts that may be selectively mounted to and removed from a tool insert to permit a family of components, for example and without limitation, components of a similar size, to be formed using the same tool insert. This may result in a further reduction in tooling costs and enhanced flexibility.

Figure 6:
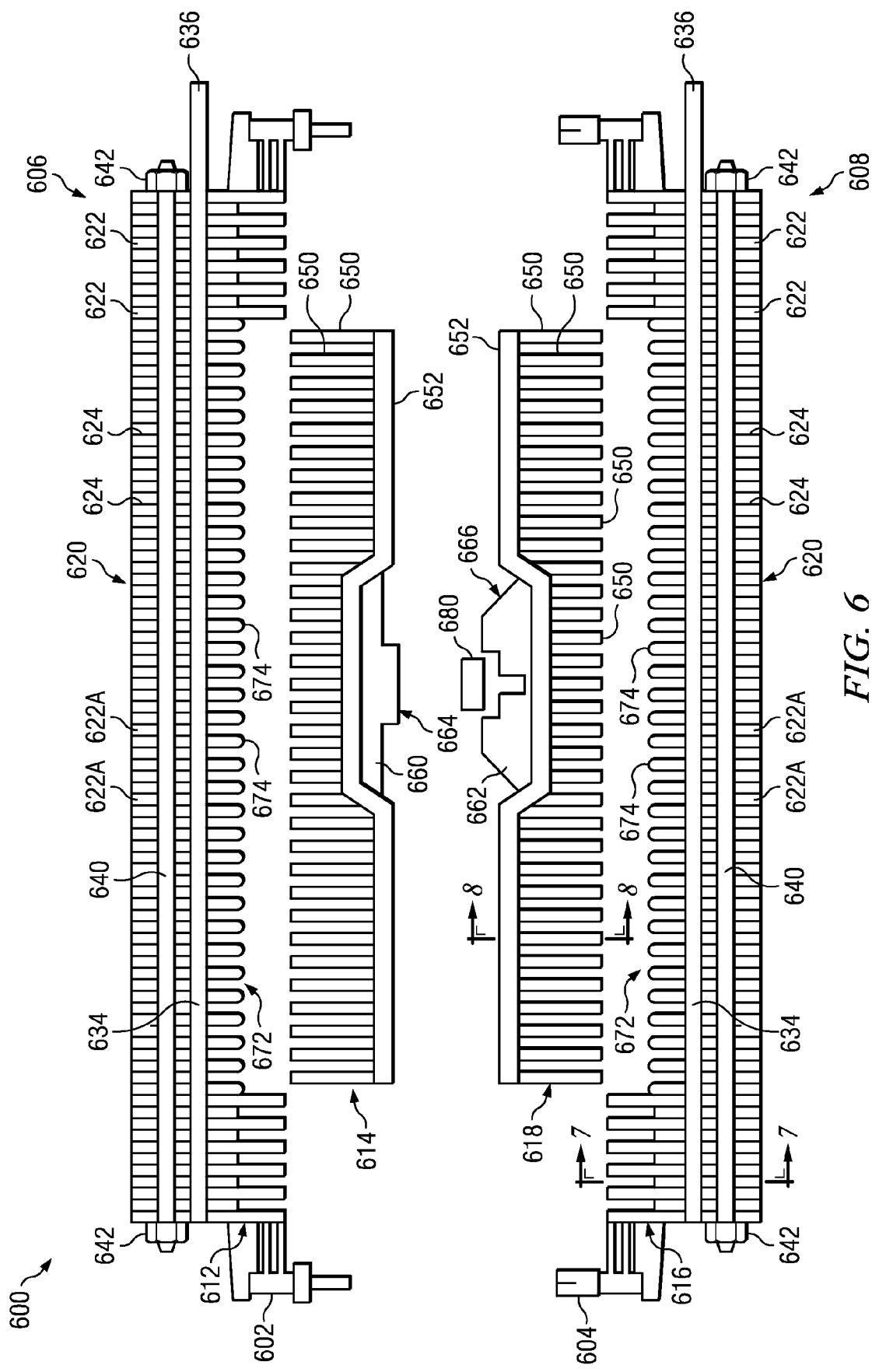
FIG. 6 is an illustration of a front plan view of an induction forming apparatus in accordance with an advantageous embodiment.

With reference now to FIG. 6, an illustration of a front plan view of an induction forming apparatus is depicted in accordance with an advantageous embodiment. The induction forming apparatus is generally designated by reference number 600, and may include a first die frame 602 supporting a first tool die 606, and a second die frame 604 supporting a second tool die 608. FIG. 6 illustrates first tool die 606 and second tool die 608 of induction forming apparatus 600 separated from one another.

First tool die 606 may include a first tool base 612 and a first tool insert 614. Second tool die 608 may include a second tool base 616 and a second tool insert 618. FIG. 6 also depicts the first and second tool inserts 614 and 618 disassembled from the first and second tool bases 612 and 616, respectively. As will be explained hereafter, the first and second tool inserts 614 and 618 may be configured to be selectively assembled to and disassembled from the first and second tool bases 612 and 616, respectively.

The first tool base 612 and the second tool base 616 may be substantially identical, and each may have a laminated structure generally designated by reference number 620. Laminated structure 620 may include a plurality of spaced metallic laminations 622 separated from one another by a plurality of dielectric stabilizers 624. Metallic lamination 622 may comprise sheets of stainless steel or another suitable material, and may be of sufficiently small thickness, for example and without limitation, about one-sixteenth inch to about one-half inch thick, to resist coupling to an induction coil (not shown in FIG. 6) that may be extended through aligned openings in the metallic laminations 622 and the dielectric stabilizers 624. According to an advantageous embodiment, for example and without limitation, the metallic laminations 622 may be constructed from austenitic stainless steel and have a thickness of about 0.180 inch, and the frequency of the associated induction coil may be 2 KHz. The dielectric stabilizers 624 may, for example and without limitation, be from about one-sixteenth inch to about one-half inch thick to fill the spaces between the metallic laminations 622.

As also shown in FIG. 6, first tool base 612 and second tool base 616 may each include a coolant conduit 634 which has a selected distribution throughout the tool bases, and which may be adapted to discharge a coolant into the first and second tool bases 612 and 616 from an external coolant source (not shown in FIG. 6) via a coolant inlet 636. The coolant may, for example and without limitation, be a gas, a liquid or a gas/liquid mixture, and may be applied as a mist or an aerosol.

First tool base 612 and second tool base 616 may each have a clamping rod 640 that may be extended through aligned openings in the metallic laminations 622 and the dielectric stabilizers 624 of the laminated structure 620. The clamping rod 640 may be perpendicular to the metallic laminations 622 and the dielectric stabilizers 624, and a pair of bolts 642 may be mounted on opposite ends of the clamping rod 640. As will be explained more fully hereinafter, the clamping rods 640 may be used to fasten the metallic laminations 622 of the laminated structure 620 of the tool bases 612 and 616 together and, in addition, to releasably secure tool inserts 614 and 618 within tool bases 612 and 616, respectively. Although FIG. 6 illustrates one clamping rod 640 for each tool base and one cooling conduit 634 for each tool base, it should be understood that each tool base may have more than one clamping rod 640 and/or more than one cooling conduit 634, if desired.

With reference now to FIG. 7, an illustration of a cross-sectional view of a tool base of a tool die of the induction forming apparatus of FIG. 6 is depicted. In particular, FIG. 7 illustrates a cross-sectional view of second tool base 616 taken along line 7-7 in FIG. 6 to show a side view of a metallic lamination 622 of laminated structure 620 of second tool base 616. The metallic laminations 622 in first tool base 612 may be identical to those in second tool base 616, albeit turned upside down relative to the laminations in second tool base 616, and thus are not illustrated herein.

As shown in FIG. 7, metallic lamination 622 may be of generally rectangular shape and may include a plurality of openings 702 for receiving an induction coil (not shown in FIG. 7). In addition, each metallic lamination 622 may have an opening 704 for receiving coolant conduit 634 (not shown in FIG. 7), and an opening 706 for receiving clamping rod 640 (not shown in FIG. 7). Although only one opening 704 for receiving a cooling conduit and only one opening 706 for receiving a clamping rod are illustrated in FIG. 7, there may be more than one opening for receiving more than one clamping rod and/or more than one cooling conduit. The holes in each metallic lamination 622, as well as corresponding holes in the dielectric stabilizers 624 therebetween (not shown in FIG. 7) are lined up so that the induction coil, coolant conduit and clamping rod may be easily installed in the laminated structure 620.

Returning now to FIG. 6, the plurality of spaced metallic laminations 622 forming laminated structure 620 of tool bases 612 and 616, may include a plurality of truncated metallic laminations 622A. Truncated laminations 622A may be centrally positioned in the laminated structure 620 of each tool base 612 or 616 to define a tool insert receiving cavity 672 in each tool base.

The dielectric stabilizers 624 between truncated laminations 622A may also be truncated, however, they may be of sufficient length to include protruding portions 674 which protrude somewhat into cavity 672 to assist in positioning tool insert 614 or 616 in cavity 672 in its respective tool base 612 or 616.

First tool insert 614 and second tool insert 618 each have a plurality of spaced metallic laminations 650. Metallic laminations 650 may, without limitation, be formed of austenitic stainless steel, and are maintained together as a unit by being attached to die susceptor 652. Die susceptor 652 may, for example and without limitation, be formed of molybdenum, which has good high temperature strength and high thermal conductivity, although it should be understood that a tungsten alloy as well as other materials may also be used. Metallic laminations 650 may have substantially the same thickness as metallic laminations 622 of bases 612 and 616; however, unlike the metallic laminations 622 in tool bases 612 and 616, the spaces between metallic laminations 650 do not include dielectric stabilizers, but, instead, are left open.

With reference now to FIG. 8, an illustration of a cross-sectional view of a tool insert of a tool die of FIG. 6 is depicted. In particular, FIG. 8 is an illustration of a cross-sectional view of second tool insert 618 in FIG. 6, taken along line 8-8 in FIG. 6 to show a side view of a metallic lamination 650 of second tool insert 618. The metallic laminations 650 of the first tool insert 614 may be substantially identical to metallic laminations 650 of the second tool insert 618, albeit turned upside down, and, accordingly, has not been illustrated.

As shown in FIG. 8, metallic lamination 650 may be of generally rectangular shape, similar in shape to metallic laminations 622 of the tool bases; however, laminations 650 are somewhat shorter in height so as to fit in cavities 672 in the tool bases 612 and 616 as will be explained hereinafter. As shown in FIG. 8, metallic laminations 650 also differ from metallic laminations 622 (not shown in FIG. 8) in that they may not include any openings for receiving an induction coil, coolant conduit or clamping rod, although, as shown in dotted line in FIG. 8, the metallic laminations 650 may, if desired, include cutouts 852 to receive the induction coil to permit the induction coil to be placed closer to the susceptors 652. Metallic laminations 650 may include a plurality of expansion slots 850 along the outer edge 852 thereof to accommodate thermal expansion and contraction of the laminations 650 during use of induction forming apparatus 600.

Returning again to FIG. 6, metallic laminations 650 of first and second tool inserts 614 and 616 are configured to define the configuration of a component to be formed therebetween. In particular, as shown in FIG. 6, the metallic laminations 650 of first tool insert 614 are configured such that die susceptor 652 thereon is contoured to define first component forming surface 660 thereon, and the metallic laminations 650 of second tool insert 618 are configured such that die susceptor 652 thereon is contoured to define second component forming surface 662 thereon. First and second component forming surfaces 660 and 662 may have the same or different shapes depending on the desired shape of the component to be formed therebetween, and it should be understood that the shapes of component forming surfaces 660 and 662 illustrated in FIG. 6 are intended to be exemplary only. The first and second component forming surfaces 660 and 662 may define forming cavity portions 664 and 666, which together define a forming cavity for forming a component therein. The metallic laminations 650 of the tool inserts 614 and 616 may be attached to the die susceptors 652 by spot welding or in another suitable manner.

FIG. 6 also schematically illustrates a material 680 to be formed by induction forming apparatus 600. As will be explained more fully hereinafter, material 680 may be a thermoplastic pre-form material, for example and without limitation, a composite thermoplastic pre-form material, to be molded by induction forming apparatus 600 to form a molded component of a desired shape; or it may be a powder material, for example and without limitation, a low cost titanium powder, to be consolidated by induction forming apparatus 600 to form a consolidated titanium component of a desired shape.

Figure 9:
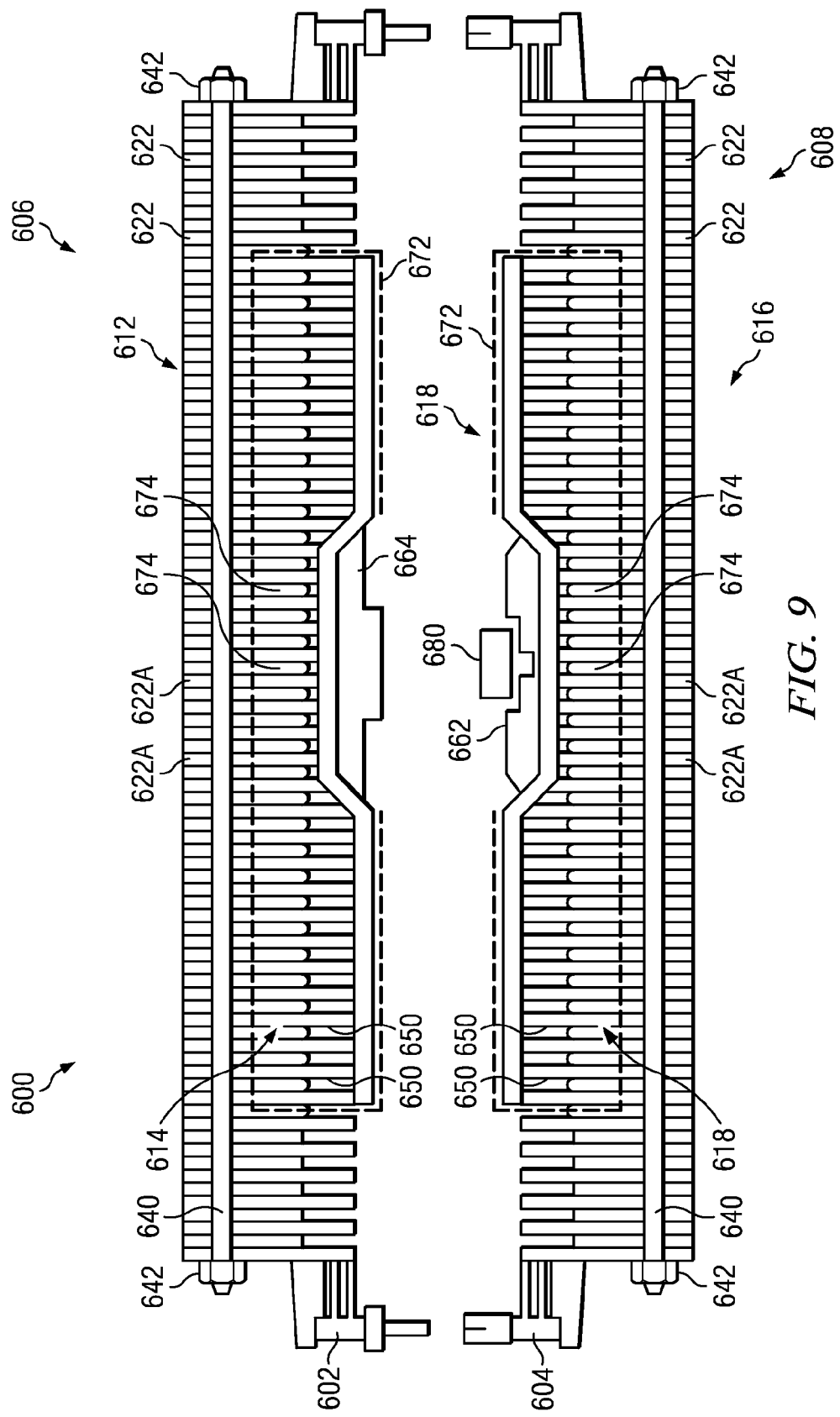
FIG. 9 is an illustration of a front plan view of the induction forming apparatus of FIG. 6 with tool inserts inserted into tool bases of the tool dies in accordance with an advantageous embodiment.

With reference now to FIG. 9, an illustration of a front plan view of the induction molding apparatus of FIG. 6, which is also a front plan view, with the tool inserts inserted into tool bases of the tool dies is depicted in accordance with an advantageous embodiment. As shown, first tool insert 614 has been inserted in cavity 672 (shown in dotted line) of first tool base 612, and second tool insert 618 has been inserted in cavity 672 (also shown in dotted line) in second tool base 616. As a tool insert 614 or 618 is inserted into a cavity 672, the protruding stabilizer portions 674 (FIG. 6) extend into the spaces between metallic laminations 650 in the tool inserts to assist in lining up the tool inserts 614 and 618 with the cavities 672 in the tool bases 612 and 616.

To assemble first and second tool dies 606 and 608, the bolts 642 mounted on the ends of clamping rod 640 may be rotated to loosen, i.e., slightly separate, the laminations 622 and 622A in the tool bases 612 and 616. If different tool inserts 614 and 618 are currently attached to the tool bases 612 and 616, those tool inserts 614 and 618 may be released from the tool bases 612 and 616 upon loosening the clamping rods 640 and may be then removed from the cavities 672 in the tool bases 612 and 616. Tool inserts 614 or 618 having susceptor dies 652 of a desired contour may then be inserted into the cavities 672 in the tool bases 612 and 616 using the protruding dielectric stabilizer portions 674 on the tool bases 612 and 616 to assist in guiding the tool inserts 614 and 618 into their respective cavities 672. After the tool inserts 614 and 618 have been fully inserted into their respective cavities 672, the bolts 642 may be rotated to tighten the metallic laminations 622 and 622A in the tool bases 612 and 616 and to secure the newly positioned tool inserts 614 and 618 in place in the tool bases 612 and 616.

Figure 10:
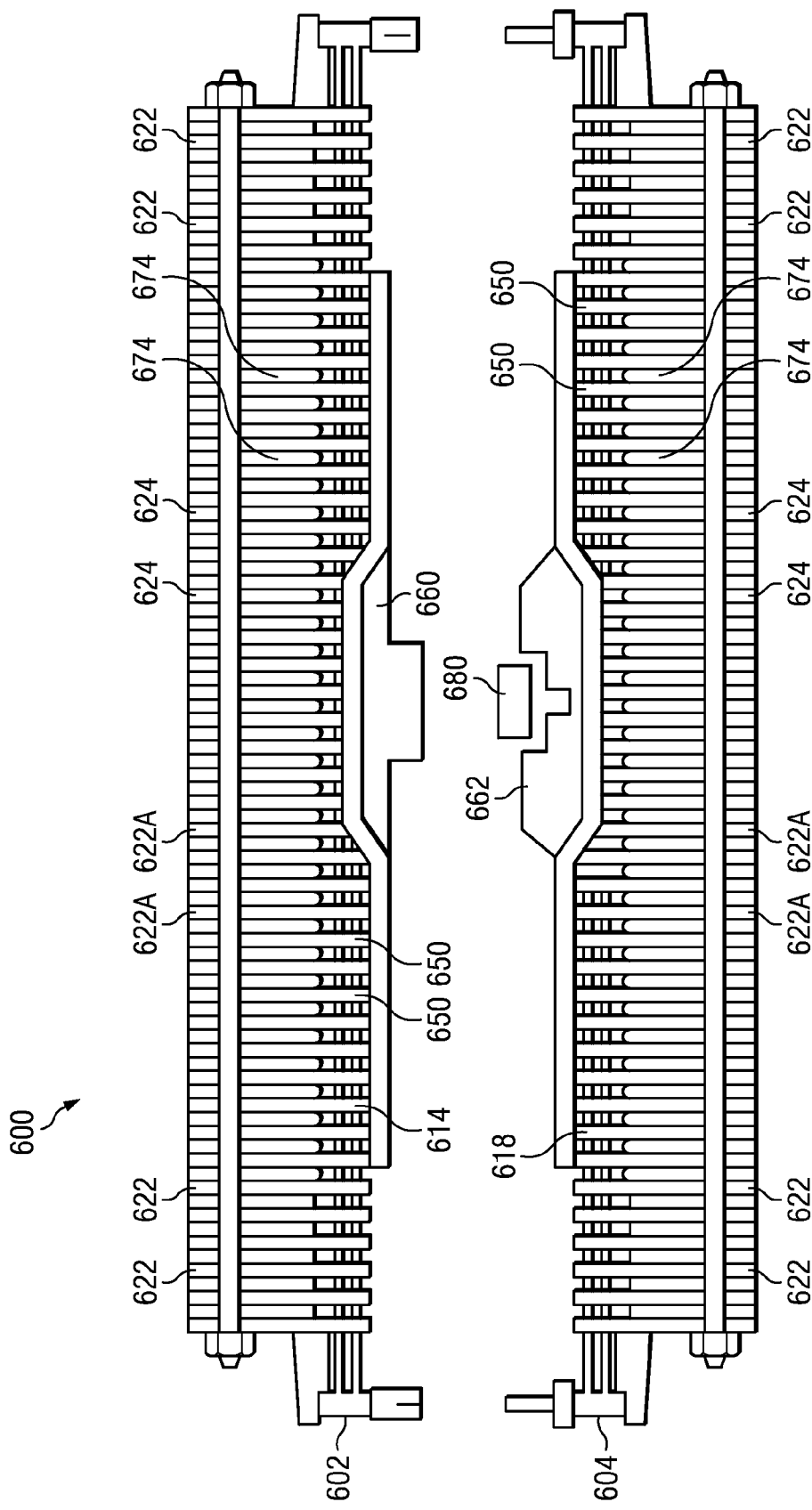
FIG. 10 is an illustration of a front plan view of the induction forming apparatus of FIG. 6 with the tool inserts fully assembled to the tool bases thereof in accordance with an advantageous embodiment.

With reference now to FIG. 10, an illustration of a front plan view of the induction molding apparatus of FIG. 6, which is also a front plan view, with the tool inserts 614 and 618 thereof fully assembled to the tool bases 612 and 616 thereof is depicted in accordance with an advantageous embodiment. As shown in FIG. 10, when fully assembled, the dielectric stabilizers 624 between the metallic laminations 622 and 622A, including the protruding portions 674, now between the metallic laminations 650 of the tool inserts 614 and 618, tend to expand and fill the spaces between the metallic laminations 650 to effectively electrically isolate the metallic laminations 650 from one another.

Figure 11:
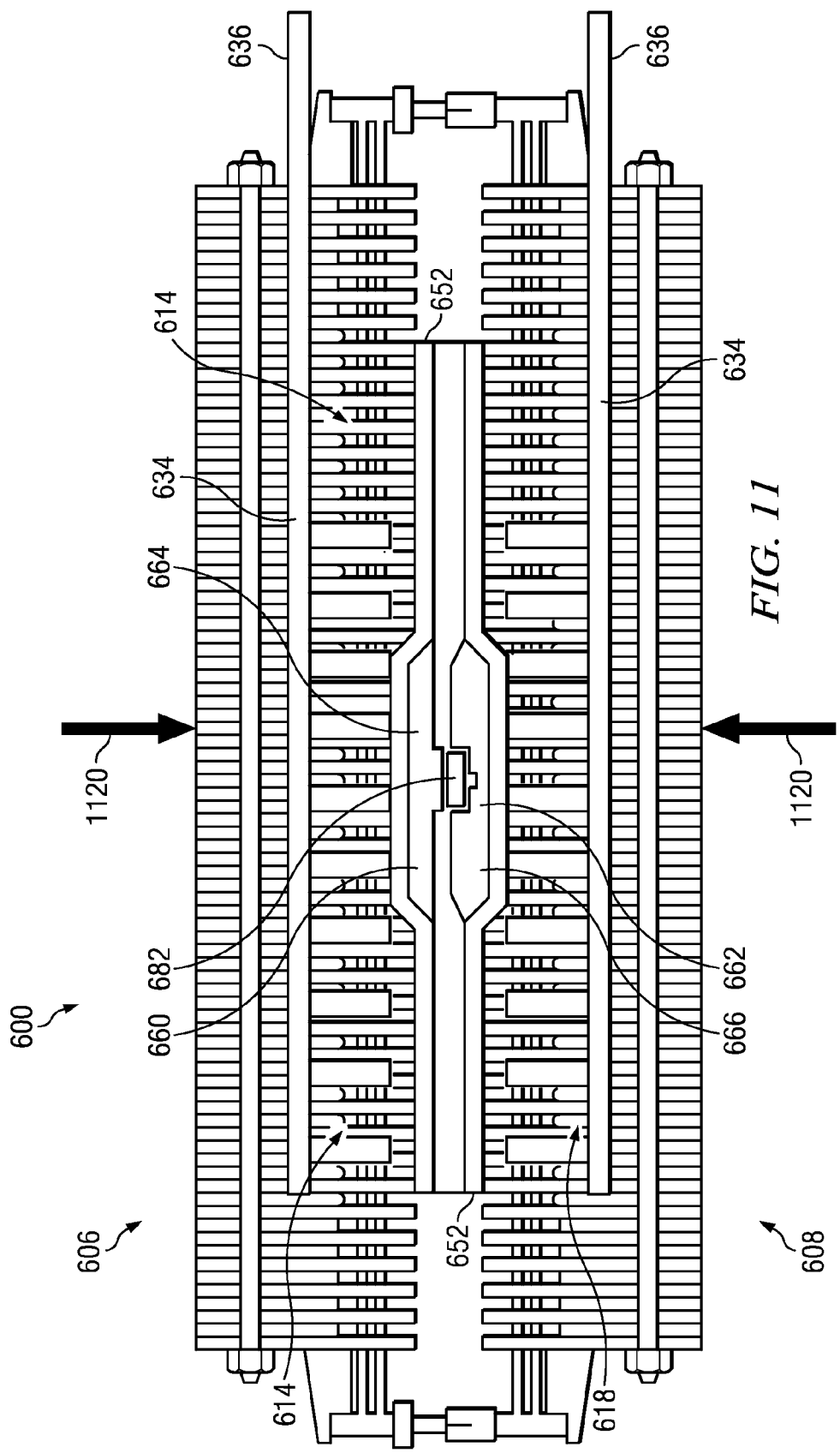
FIG. 11 is an illustration of a front plan view of the fully assembled induction forming apparatus of FIG. 10 with the tool dies thereof applying pressure to form a component therebetween in accordance with an advantageous embodiment.

With reference now to FIG. 11, an illustration of a front plan view of the fully assembled induction molding apparatus of FIG. 10 which is also a front plan view, is depicted with the tool dies 606 and 608 thereof applying pressure to form a component therebetween in accordance with an advantageous embodiment. In order to form a component, a powder or a thermoplastic molding compound 680 is initially positioned between the first and second tool dies 606 and 608, for example, by being placed in forming cavity portion 662 in second tool insert 618. The first tool die 606 and the second tool die 608 are then moved toward one another by as indicated by arrows 1120.

As the first and second tool dies 606 and 608 are moved toward each other, the induction coils therein (not shown) are actuated to heat the first tool die 606 and the second tool die 608, and, in particular, the die susceptors 652 thereon. Therefore, as the first tool die 606 and the second tool die 608 move toward each other, they rapidly heat the powder/molding compound 680. As the first tool die 606 and the second tool die 608 continue to move toward each other, and, finally, close against the powder/molding compound 680, the powder/molding compound 680 may be consolidated/molded to form a component 682 having a configuration defined by the contours of the molding surfaces 660 and 662 of the die susceptors 652.

At that time, the cooling system is operated to apply coolant from an external coolant source (not shown in FIG. 11) to the coolant conduits 634 via the coolant inlets 636 into the first and second tool dies 606 and 608 to cool the dies 606 and 608 and the die susceptors 652 thereon. As a result, the formed component 682 is also rapidly cooled. After a predetermined period of time, when complete cooling of the formed component has occurred, and the formed component 682 is able to retain its shape, the cooling system is turned off and the tool dies 606 and 608 are separated from one another. The formed and cooled component 682 may then be removed from the induction forming apparatus 600.

Figure 12:
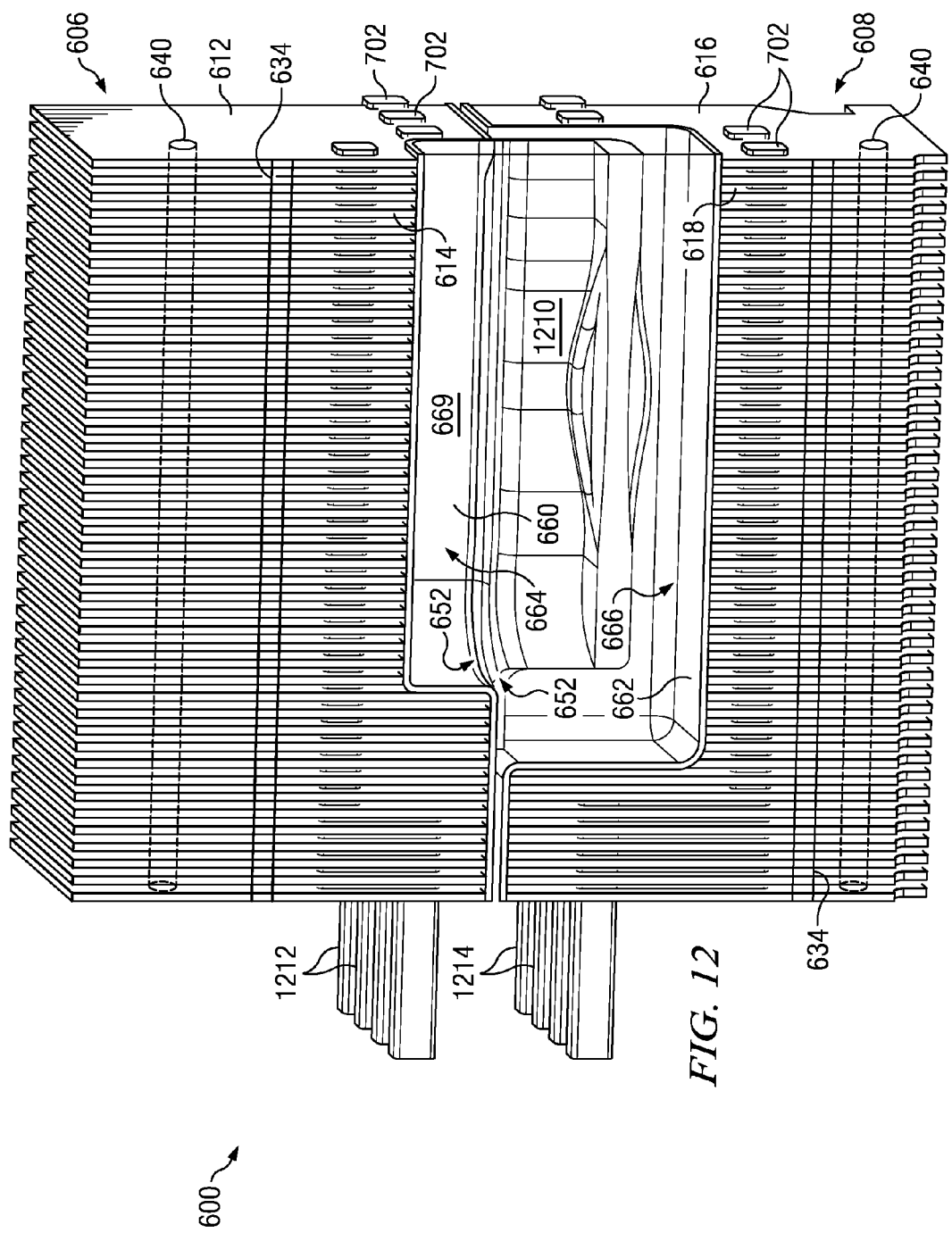
FIG. 12 is a perspective side view of a portion of the induction forming apparatus of FIG. 6 in accordance with an advantageous embodiment.

With reference now to FIG. 12, a perspective side view of a portion of the induction forming apparatus of FIG. 6 is depicted in accordance with an advantageous embodiment. In particular, FIG. 12 illustrates the induction forming apparatus 600 with the tool dies 606 and 608 thereof applying pressure to form a component (not shown) therebetween, and with portions removed to show internal details of the apparatus. The first and second die frames 602 and 604 have also been omitted in FIG. 12 to better illustrate the apparatus.

As shown in FIG. 12, the component forming surfaces 660 and 662 of die susceptors 652 define forming cavity portions 664 and 666, respectively, which together define forming cavity 1210 within which a component may be formed. FIG. 12 also shows portions of induction coils 1212 and 1214 extending through openings 702 also shown in FIG. 7. As shown in FIG. 12, the induction coils 1212 and 1214 may curve around the tool inserts 614 and 618, as shown in FIG. 12, but do not extend through the tool inserts, although, as indicated previously with reference to FIG. 8, the tool inserts may, if desired, be provided with cutouts to receive the induction coils to enable the induction coils to be positioned closer to the die susceptors 652.

Figure 13:
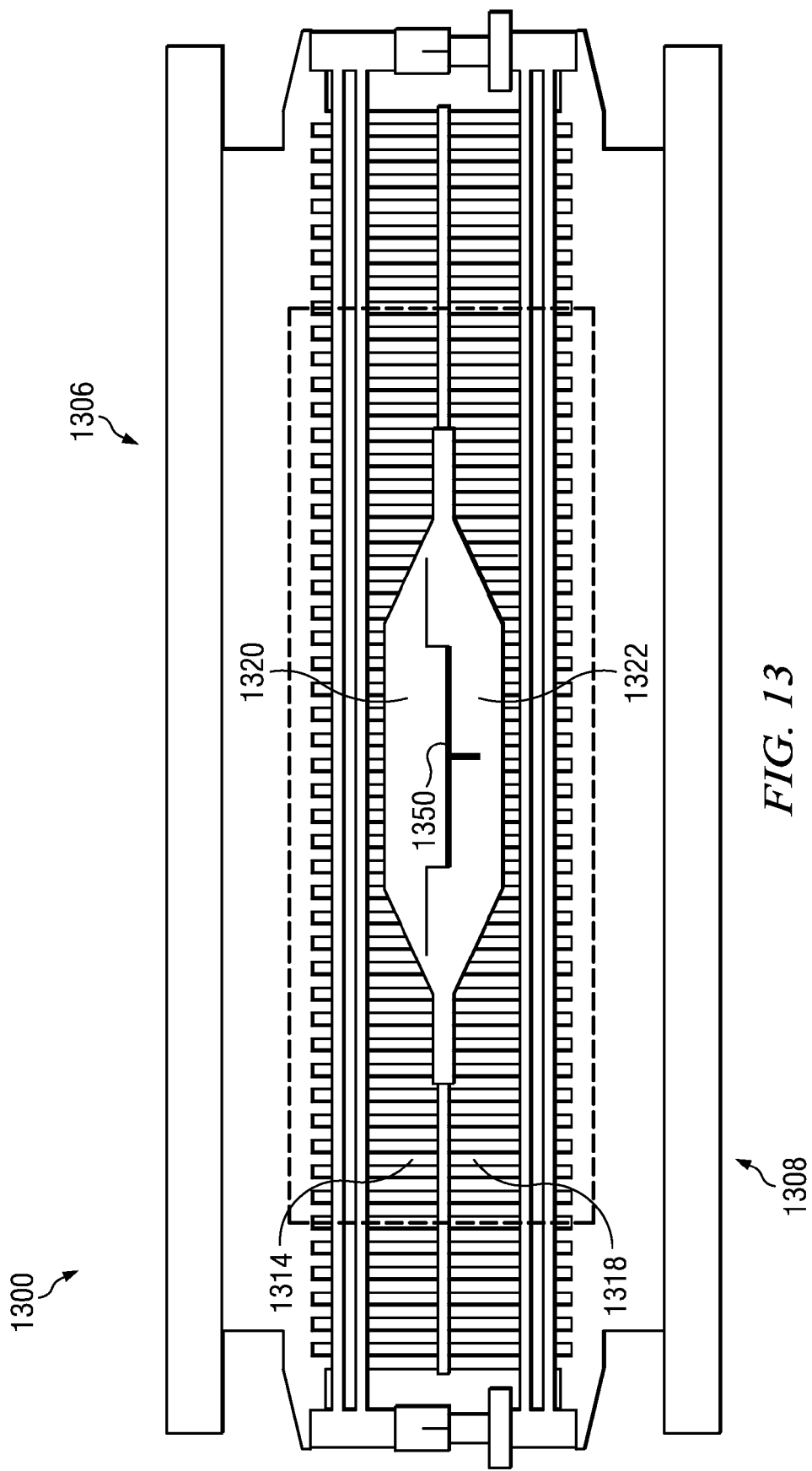
FIG. 13 is an illustration of a front plan view of an induction forming apparatus in accordance with a further advantageous embodiment.

With reference now to FIG. 13, an illustration of front plan view of an induction forming apparatus is depicted in accordance with a further advantageous embodiment. In the advantageous embodiment illustrated in FIGS. 6-11, differently-shaped components can be formed by induction forming apparatus 600, simply by changing tool inserts 614 and 618 of tool dies 606 and 608 without changing tool bases 612 and 616. In the advantageous embodiment illustrated in FIG. 13, the tool inserts include removable die susceptor inserts to permit the same tool inserts to be used to form a family of different components.

In particular, FIG. 13 illustrates induction forming apparatus 1300. Induction forming apparatus 1300 may be identical to induction forming apparatus 600 in FIG. 6, except that the die susceptors thereof are first and second die susceptor inserts 1320 and 1322 that may be removably inserted into and removed from the first and second tool inserts 1314 and 1318. By providing die susceptor inserts 1320 and 1322, a family of components, for example and without limitation, components of generally the same size, may be formed using the same tool inserts 1314 and 1318 but by changing only the die susceptor inserts 1320 and 1322.

Figure 14:
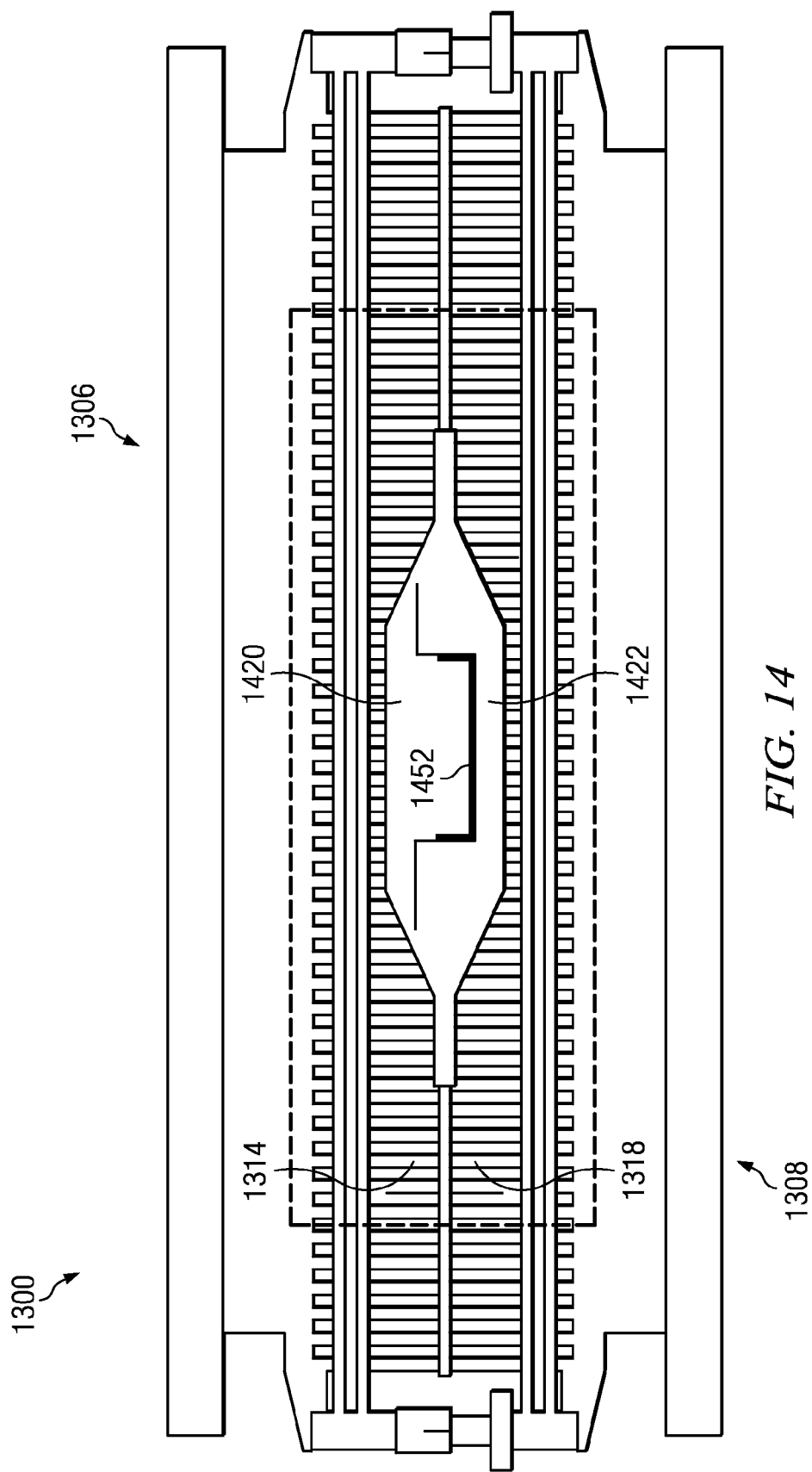
FIG. 14 is an illustration of a front plan view of the induction forming apparatus of FIG. 13 with a different die susceptor insert positioned therein in accordance advantageous embodiment.

For example, FIG. 13 illustrates die susceptor inserts 1320 and 1322 for forming a t-shaped fitting 1350, whereas FIG. 14 illustrates die susceptor inserts 1420 and 1422 for forming a U-shaped bracket 1452.

Except for the tool inserts 1314 and 1318 and their die susceptor inserts 1320 and 1322, the first and second tool dies 1306 and 1308 are the same as illustrated, in FIGS. 6-11. Both can utilize the same tool bases and the same induction coils, coolant system and clamping rods. Therefore, when it is desired to consolidate/mold components having different surface contours, the bulk of the forming apparatus 1300 can be reused with a substantial savings in cost and inventory requirements.

FIG. 15 is an illustration of a flowchart of a process for forming a component in accordance with an advantageous embodiment. The process is generally designated by reference number 1500, and may begin by providing first and second tool dies, each of the first and second tool dies having a tool base (operation 1502). The tool base of each of the first and second tool dies may include a laminated structure having a plurality of spaced metallic laminations, and the laminated structure of each tool base may have a truncated portion forming a cavity configured to receive a tool insert, and at least one opening for receiving an induction coil. A tool insert may be positioned in the cavity of the tool base of each of the first and second tool dies (operation 1504). Each tool insert may have a die susceptor capable of being heated by the induction coil. A powder/molding compound may then be positioned between the first tool die and the second tool die (operation 1506). The first tool die and the second tool die may then be moved toward one another and against the powder/molding compound for forming a component between the die susceptor of the tool insert of the first tool die and the die susceptor of the tool insert of the second tool die (operation 1508), and the process ends.

FIG. 16 is an illustration of a flowchart of a process for assembling an induction forming apparatus in accordance with an advantageous embodiment. The process illustrated in FIG. 16 may be implemented as part of a process for consolidating/molding a component using the consolidation/molding apparatus depicted, for example, in FIGS. 13 and 14. The process is generally designated by reference number 1600, and may begin by determining whether tool inserts are currently assembled to tool bases of first and second tool dies of the induction molding apparatus (operation 1602). If it is determined that tool inserts are currently assembled to the tool bases (Yes output of operation 1602), it is determined whether the currently assembled tool inserts are the correct tool inserts for forming a desired component (operation 1604). If it is determined that the currently assembled tool inserts are the correct tool inserts for forming a desired component (Yes output of operation 1604), it is determined whether the tool inserts have the correct die susceptor inserts for forming the desired component (operation 1606). If it is determined that the tool inserts have the correct die susceptor inserts for forming the desired component (Yes output of operation 1606), the currently assembled tool inserts may be used to form the desired component, and the process terminates. If it is determined that the tool inserts do not have the correct die susceptor inserts for forming the desired component (No output of operation 1606), the correct die susceptor inserts are mounted in the tool inserts (operation 1608), and the process ends.

Returning to operation 1604, if it is determined that the currently assembled tool inserts are not the correct tool inserts for forming a desired component (No output of operation 1604), the currently assembled tool inserts are disassembled from the tool bases, for example, by operating a clamping mechanism to release the tool inserts (operation 1610). The disassembled tool inserts are then removed from the tool bases (operation 1612), for example, by hand or by mechanical means.

A set of the correct tool inserts having correct die susceptor inserts for forming the desired component may then be obtained (operation 1614). Similarly, if, in operation 1602, it is determined that no tool inserts are currently assembled to the tool bases (No output of operation 1602), the process proceeds directly to operation 1614. The correct set of tool inserts having correct die susceptor inserts may be obtained from an inventory of sets of tool inserts and die susceptor inserts configured for use with the tool bases and having different die susceptor contours for forming different components. The obtained correct set of tool inserts having the correct die susceptor inserts may then be inserted into the tool bases (operation 1616), and the tool inserts may then be secured to the tool bases, for example, by operating the clamping mechanism (operation 1618) with the process terminating thereafter.

Figure 17:
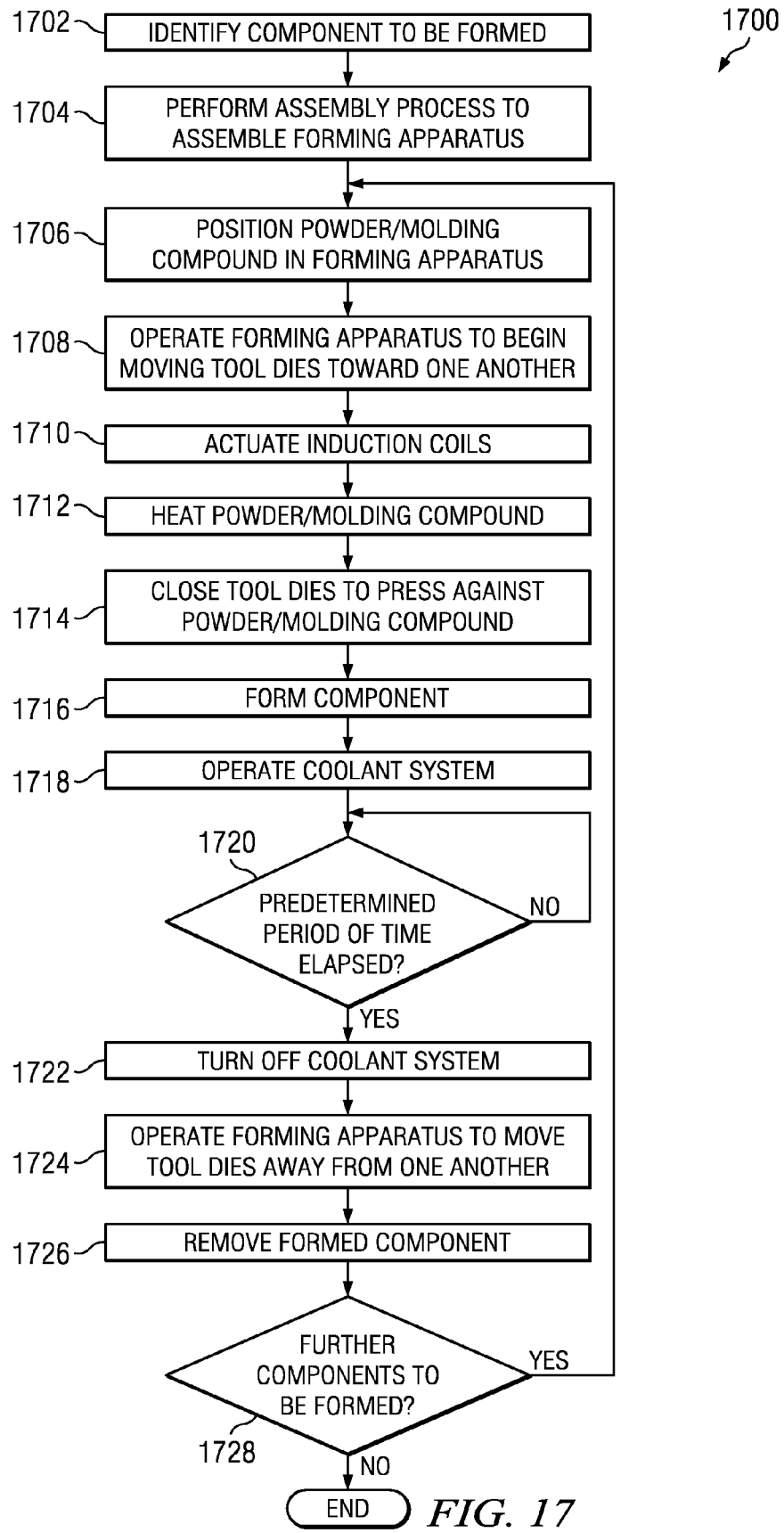
FIG. 17 is an illustration of a flowchart of a process for forming components in accordance with an advantageous embodiment.

FIG. 17 is an illustration of a flowchart of a process for forming a plurality of components according to an advantageous embodiment. The process may, for example, be implemented using consolidation/molding apparatus 1300 illustrated in FIGS. 13 and 14. The process is generally designated by reference number 1700, and may begin by identifying a particular component to be formed (operation 1702). An assembly process may then be performed to assemble a forming apparatus to form the particular component (operation 1704). The assembly process may be implemented as the assembly process illustrated in FIG. 16.

A powder/molding compound suitable for consolidating/molding the particular component is then positioned in the forming apparatus between the first and second tool dies thereof (operation 1706). The forming apparatus is then operated to begin moving the first tool die and the second tool die of the forming apparatus toward one another (operation 1708). As the first and second tool dies are moved toward one another, induction coils are actuated to heat the first tool die and the second tool die and the die susceptors on tool inserts of the first and second tool dies (operation 1710). Therefore, as the first tool die and the second tool die move toward each other, they rapidly heat the powder/molding compound (operation 1712). As the first tool die and the second tool die continue to move toward each other, they finally close and press against the powder/molding compound (operation 1714), causing the powder/molding compound to be consolidated/molded to the configuration of the particular component (operation 1716).

At that time, the coolant system is operated to supply coolant to the first tool die and the second tool die to rapidly cool the die susceptors and the consolidated/molded component therebetween (operation 1718). As a result, the consolidated/molded component sandwiched between the die susceptors is also rapidly cooled. It is then determined if a predetermined period of time has elapsed (operation 1720). The predetermined period of time may be selected to ensure complete cooling of the formed component to ensure that the component is able to retain its shape. If the predetermined time period has elapsed (Yes output of operation 1720), the coolant system is turned off (operation 1722), and the forming apparatus is operated to move the first and second tool dies away from one another (operation 1724). The formed and cooled component is then removed from the forming apparatus (operation 1726). If the predetermined period of time has not elapsed (No output of operation 1720), the process returns to operation 1720.

A determination is then made whether a further component is to be formed (operation 1728). If a further component is to be formed (Yes output of operation 1728), the process returns to operation 1706. If a further component is not to be formed (No output of operation 1728), the process ends.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
a first tool die and a second tool die, the first tool die and the second tool die each comprising:
a tool base, the tool base comprising a laminated structure having a plurality of spaced metallic laminations, the laminated structure having a truncated portion forming a cavity configured to receive a tool insert, and at least one first opening for receiving an induction coil; and
a tool insert configured to be received in the cavity of the tool base, the tool insert having a die susceptor capable of being heated by the induction coil; and
an actuator for moving the first tool die and the second tool die toward one another for forming a component between the die susceptor of the tool insert of the first tool die and the die susceptor of the tool insert of the second tool die.

2. The apparatus of claim 1, wherein the tool insert comprises a plurality of spaced metallic laminations, the plurality of spaced laminations of the tool insert being received in the cavity of the tool base.

3. The apparatus of claim 2, wherein the laminated structure of the tool base further comprises a plurality of dielectric stabilizers between the plurality of spaced metallic laminations of the laminated structure.

4. The apparatus of claim 3, wherein dielectric stabilizers of the plurality of dielectric stabilizers aligned with the cavity include protruding portions that extend into the cavity to fill spaces between the plurality of spaced metallic laminations of the tool insert when the tool insert is received within the cavity.

5. The apparatus of claim 1, wherein the laminated structure further comprises a second opening therein for receiving a coolant for cooling the die susceptor and the component.

6. The apparatus of claim 1, wherein the laminated structure further comprises a third opening, and a clamping rod extending through the third opening for securing the metallic laminations of the laminated structure together and for releasably securing the tool insert within the cavity of the tool base.

7. The apparatus of claim 1, wherein the tool insert has a die susceptor insert receiving cavity for receiving a die susceptor insert therein.

8. The apparatus of claim 1, wherein the component comprises one of a molded thermoplastic component or a consolidated powder component.

9. The apparatus of claim 8, wherein the molded thermoplastic component comprises a molded thermoplastic composite component.

10. The apparatus of claim 8, wherein the consolidated powder component comprises a consolidated titanium powder component.

11. The apparatus of claim 1, wherein the component comprises a component for an aircraft.

12. A method for forming a component, comprising:
 providing a first tool die and a second tool die, the first tool die and the second tool die each having a tool base comprising a laminated structure having a plurality of spaced metallic laminations, the laminated structure of each tool base having a truncated portion forming a cavity configured to receive a tool insert, and at least one opening for receiving an induction coil;
 positioning a tool insert in the cavity of the tool base of each of the first and second tool dies, the tool insert having a die susceptor capable of being heated by the induction coil; and
 moving the first tool die and the second tool die toward one another for forming a component between the die susceptor of the tool insert of the first tool die and the die susceptor of the tool insert of the second tool die.

13. The method of forming a component according to claim 12, and further comprising:
 securing the tool insert in the cavity of the tool base of each of the first and second tool dies.

14. The method of forming a component according to claim 12, and further comprising:
 obtaining the tool insert for each of the first and second tool dies from an inventory of tool inserts having die susceptors contoured to form components having different configurations.

15. The method of forming a component according to claim 14, and further comprising:
 removing tool inserts currently positioned in the tool bases of the first and second tool dies prior to positioning the obtained tool insert for each of the first and second tool dies in the tool bases of the first and second tool dies.

16. The method of forming a component according to claim 12, and further comprising:
 removing the tool insert positioned in the tool base of each of the first and second tool dies; and
 positioning a different tool insert having a differently contoured die susceptor in the cavity of the tool base of each of the first and second tool dies.

17. The method of forming a component according to claim 12, further comprising:
 positioning a die susceptor insert in a die susceptor insert cavity in each tool insert.

18. The method of forming a component according to claim 17, and further comprising:
 obtaining the die susceptor insert for each tool insert from an inventory of die susceptor inserts having die susceptors contoured to form components having different configurations.

19. The method of forming a component according to claim 17, further comprising:
 removing the die susceptor insert positioned in the die susceptor insert cavity in each tool insert; and
 positioning a different die susceptor insert a having differently contoured die susceptor in the die susceptor insert cavity in each tool insert.

20. The method of forming a component according to claim 12, wherein forming a component between the die susceptor of the tool insert of the first tool die and the die susceptor of the tool insert of the second tool die comprises one of molding a thermoplastic component between the die susceptor of the tool insert of the first tool die and the die susceptor of the tool insert of the second tool die, or consolidating a powder component between the die susceptor of the tool insert of the first tool die and the die susceptor of the tool insert of the second tool die.

21. A method for forming a component, comprising:
 providing a first tool die and a second tool die, the first tool die and the second tool die each having a tool base comprising a laminated structure having a plurality of spaced metallic laminations, the laminated structure of each tool base having a truncated portion forming a cavity configured to receive a tool insert, and at least one opening for receiving an induction coil;
 selecting tool inserts for the tool bases of each of the first and second tool dies;
 selecting die susceptor inserts for the tool inserts, the selected die susceptor inserts having die susceptors for forming a component;
 positioning the selected die susceptor inserts in the selected tool inserts;
 positioning the selected tool inserts in the cavities of the tool bases of each of the first and second tool dies; and
 moving the first tool die and the second tool die toward one another for forming the component between the die susceptors of the selected die susceptor inserts.

* * * * *